United States Patent
Thomas et al.

(10) Patent No.: US 7,765,590 B2
(45) Date of Patent: Jul. 27, 2010

(54) DEVICE AND METHOD FOR DETECTING AND PREVENTING INTRUSION INTO A COMPUTER NETWORK

(75) Inventors: Fabien Thomas, Villeneuve d'Ascq (FR); Georges Lotigier, Hem (FR)

(73) Assignee: NETASQ, Villeneuve d'Ascq (FR)

( * ) Notice: Subject to any disclaimer, the term of this patent is extended or adjusted under 35 U.S.C. 154(b) by 0 days.

(21) Appl. No.: 10/594,106

(22) PCT Filed: Mar. 24, 2005

(86) PCT No.: PCT/FR2005/000711
§ 371 (c)(1),
(2), (4) Date: Jul. 24, 2007

(87) PCT Pub. No.: WO2005/094035
PCT Pub. Date: Oct. 6, 2005

(65) Prior Publication Data
US 2007/0289010 A1     Dec. 13, 2007

(30) Foreign Application Priority Data
Mar. 25, 2004   (FR) .................................. 04 03114

(51) Int. Cl.
*G06F 15/16* (2006.01)
(52) U.S. Cl. .......................................... 726/13; 726/27
(58) Field of Classification Search .............. 726/11–14, 726/27
See application file for complete search history.

(56) References Cited

U.S. PATENT DOCUMENTS

| 6,219,706 | B1 |  | 4/2001 | Fan et al. |
| 6,851,061 | B1 | * | 2/2005 | Holland et al. ................. 726/23 |
| 7,076,393 | B2 | * | 7/2006 | Ormazabal et al. .......... 702/122 |
| 7,152,242 | B2 | * | 12/2006 | Douglas ....................... 726/23 |
| 7,159,237 | B2 | * | 1/2007 | Schneier et al. ................ 726/3 |
| 7,174,566 | B2 | * | 2/2007 | Yadav .......................... 726/26 |
| 7,197,762 | B2 | * | 3/2007 | Tarquini ........................ 726/3 |
| 7,308,715 | B2 | * | 12/2007 | Gupta et al. .................. 726/23 |
| 2003/0154399 | A1 | * | 8/2003 | Zuk et al. .................... 713/201 |

FOREIGN PATENT DOCUMENTS

WO    WO 00/78004    12/2000

OTHER PUBLICATIONS

Anonymous, "NETASQ' IPS-Firewalls. ASQ: Real-Time Intrusion Prevention," http://web.archive.org/web/20031121140506/www.netsaq.com/en/products/pdf/wp_asq_light102203en.pdf, 2003, retrieved Nov. 11, 2004.

* cited by examiner

*Primary Examiner*—Kambiz Zand
*Assistant Examiner*—Amare Tabor
(74) *Attorney, Agent, or Firm*—Ladas & Parry LLP

(57) ABSTRACT

A device and a method for the detection and prevention of intrusion into a computer network by detecting and blocking the intrusions before penetration of the network. The method includes a stage for detecting the connections at the central point and before each branch of the network, and a stage for selective filtering of these connections. This selective filtering of the connections includes a stage for automatic recognition of the accessing protocol, independently of the communication port used by the protocol.

12 Claims, 4 Drawing Sheets

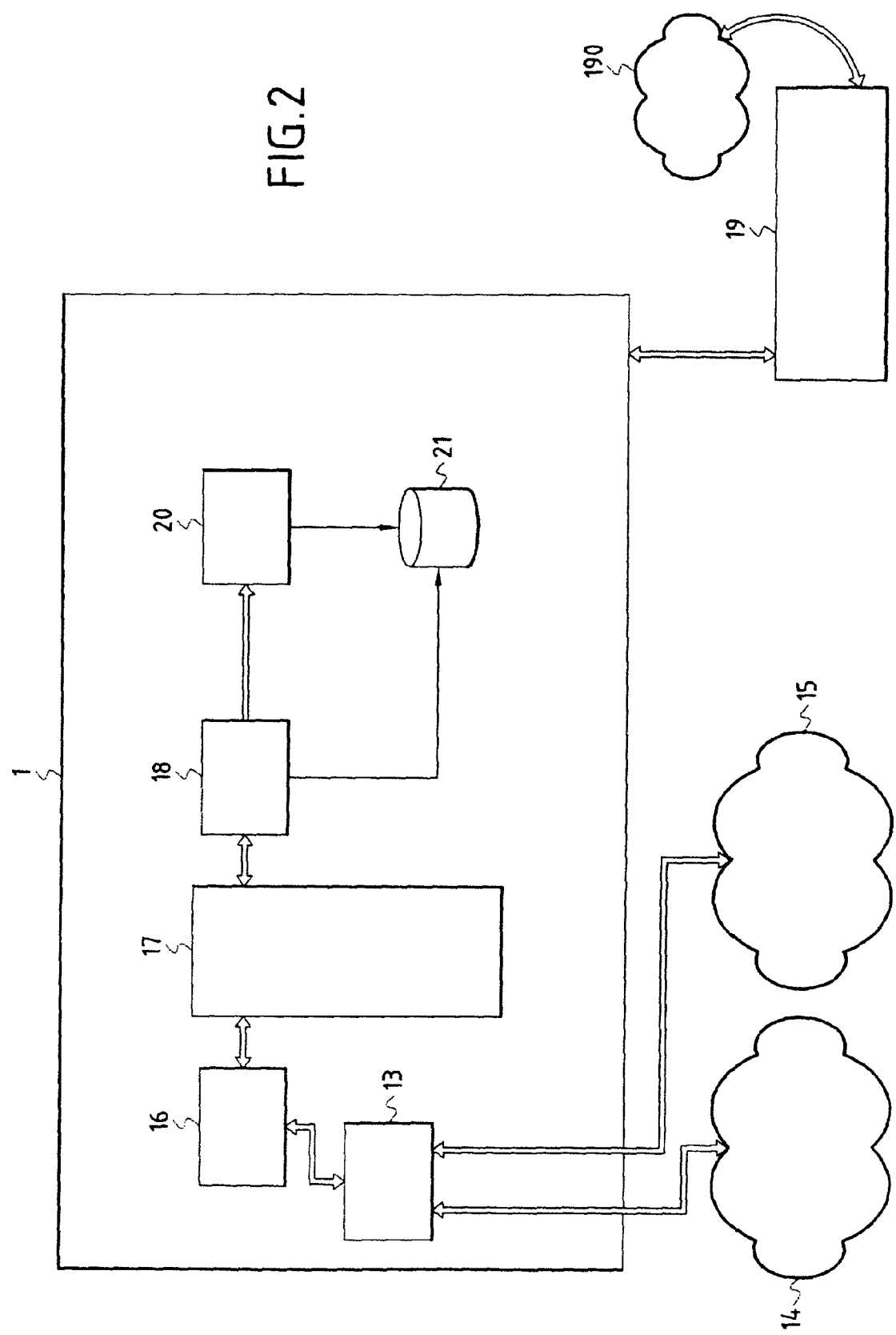

DEVICE AND METHOD FOR DETECTING AND PREVENTING INTRUSION INTO A COMPUTER NETWORK

Figure 1:
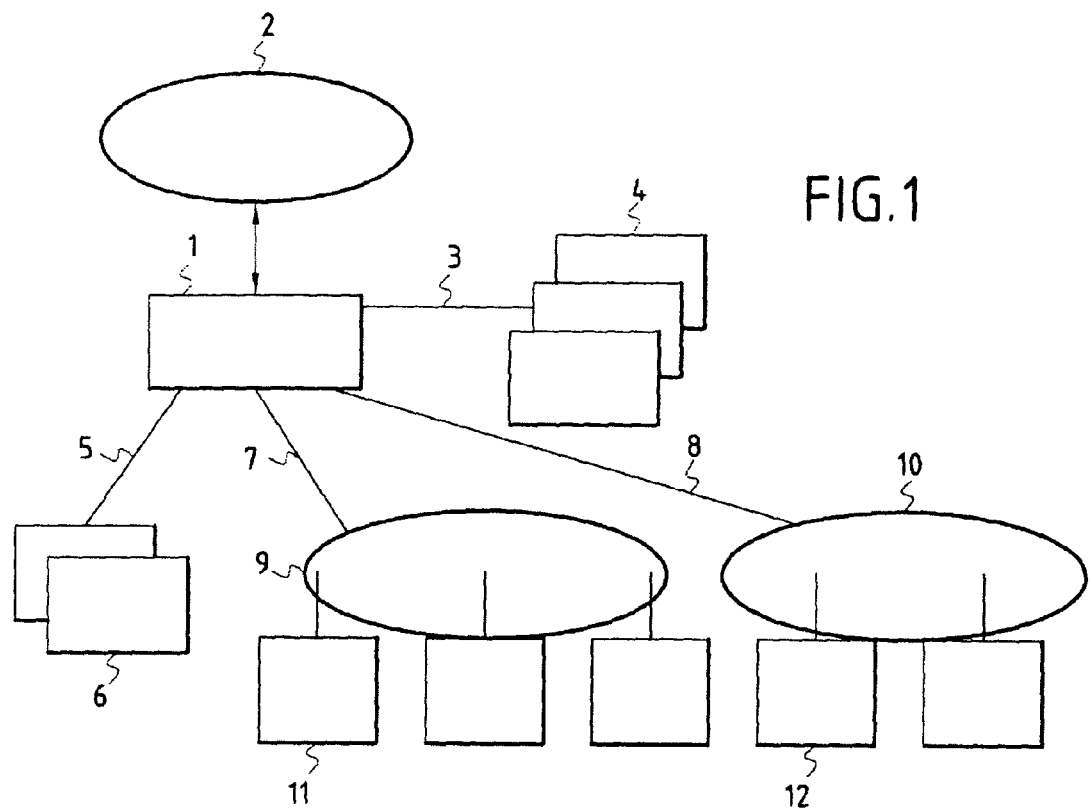

The subject of this present invention is a device and a method for the detection and prevention of intrusion into a computer network, used to prevent intrusions by detecting them and then blocking them before penetration of the network.

In a computer network, the availability of the data, and their transmission in a context of maximum security, is a constant problem. The growing complexity of attacks calls for increasingly intelligent and sophisticated protection of the network. It is necessary in fact to be able to check the format and the destination of the transiting packets, to check their content, to store the history of the sessions in order to analyse them over a given period, to distinguish between the true and the false alarms uploaded, and above all to respond to the attack before the latter has penetrated too far into the heart of the network.

Among the solutions to be found in previous designs, we are familiar with those that are based on the filtering of packets, but which achieve a low level of security since only the packet headers are checked. Filtering by proxy is another solution in which content filters are used, for example, to block access to web sites and to filter the electronic messages (e-mails) and their attachments. These solutions are not designed to block the attacks, and cause very high loss of performance. Moreover, they do not conform to the architecture of the client-server model and necessitate one proxy per communication port. We are also familiar with a method for inspecting the state of the connections for the purpose of allowing or rejecting the traffic and achieving higher performance, based on a state table, but which here again ignores the attacks. This is the principle of the network firewall, with a variant corresponding to the application firewall in which not only the state of the connections but also their content is checked.

Other complex systems also exist, such as the Intrusion Detection Systems (IDS), which are based on a database of signatures of known attacks. This base must be updated regularly. These systems have a major drawback which is that they do not block the attack but detect it only after it has passed. It is therefore frequently far too late to react, in vulnerable networks which can be compromised in a few seconds.

We are also familiar with Intrusion Prevention Systems (IPS), which, in a way, are IDSs placed so as to cut off the network, and used to both detect and block the attacks. These systems employ more elaborate detection methods, which generally combine an approach by scenario and a compartmental approach for the purpose of limiting false alarms (generated in abundance by the IDS systems) and for detecting and blocking the attacks, even new ones. In reaction to such an attack, these systems reconfigure the network firewall as a consequence. However, one of the drawbacks of these systems is that they are unable to detect attacks spread over several segments of the network since they operate on a single branch. In order to be able to protect several branches, it is necessary for have several of these systems, and this considerably complicates their management. This complexity is a source of additional security gaps, alongside the higher cost (purchase, installation and maintenance).

In addition, whatever the systems of previous designs used currently, filtering policies consist essentially of the blocking or the enabling of certain port numbers. Now more and more applications communicate via dynamic or variable ports, and some applications are coming onto the market with the objective of getting around the firewall. The consequence is that if it cannot be guaranteed that a given application will use a given port, then fixed filtering cannot be applied, based on a fixed application/communication-port association. Moreover, the fact that the applications generally use the channel previously opened to communicate with other protocols, and that it is necessary to know the operation of a protocol with precision in order to find the communication port to open or close, renders the notion of port enabling for an application rather unreliable.

There is therefore the need for a reliable solution which can be used to overcome the aforementioned drawbacks, in particular concerning the protection of a network that includes many segments, and in a context in which the attacks use variable communication ports.

The purpose of the invention is therefore to overcome these drawbacks. To this end, the invention is similar, from one viewpoint, to a method for the detection and prevention of intrusion into a computer network that includes a stage for detecting the connections at the central point and before each branch of the said network, and a stage for selective filtering of the said connections by automatic recognition of the accessing protocol, independently of the communication port used by the said protocol.

From a second viewpoint, the invention is similar to a device for the detection and prevention of intrusion into a computer network, incorporated into a firewall located in the network, thus enabling attacks to be blocked before penetration into the said network, with instantaneous reaction (no delay between the emission of an alert and executing the reinitialisation orders). Such a device integrated into the firewall protects all segments of the network, with no need to install specific devices on each of the segments.

In one implementation variant of the method, selective filtering of the connections, after the said accessing protocol has been recognised automatically, consists of continuously checking the conformity of the communications flowing in a connection associated with the said protocol, delivering a dynamic authorization for the communications resulting from normal operation of the protocol, and delivering a dynamic rejection for the communications resulting from abnormal operation of the protocol. More precisely, as long as the accessing protocol of a connection is not recognised, the data are accepted but not transmitted. If the number of data packets accepted but not transmitted exceeds a certain threshold, or if the data are accepted but not transmitted after exceeding a certain threshold for a certain time, then the connection is not enabled.

The device includes a resource for preventing intrusions by analysing communications, incorporated into the network firewall, at the central point and before each branch of the said network, where the said resource for the prevention of intrusions includes a resource for selective filtering of communications by automatic recognition of the accessing protocol, independently of the communication port used by the protocol.

In an implementation variant, the selective filtering resource includes at least one independent module for the analysis of at least one given communication protocol. At least one of the independent modules more precisely includes a unit for the automatic recognition of a given communication protocol, and a unit for verifying the conformity of the communications flowing in a connection associated with the said protocol, and is designed to deliver a dynamic authorization for communications resulting from normal operation of the protocol, and to deliver a dynamic rejection for communications resulting from abnormal operation of the protocol.

Such a device and such a method advantageously allow the blocking of both known and unknown attacks.

In another implementation variant, an interface allows the user to enter the criteria that determine the filtering policy, describing it in natural language. Moreover, the device includes a resource for statistical processing of the connection data, and a resource for the storage of these data and of the processed data (audit logs), for the purpose of simplifying the later handing of these data.

Figure 3:
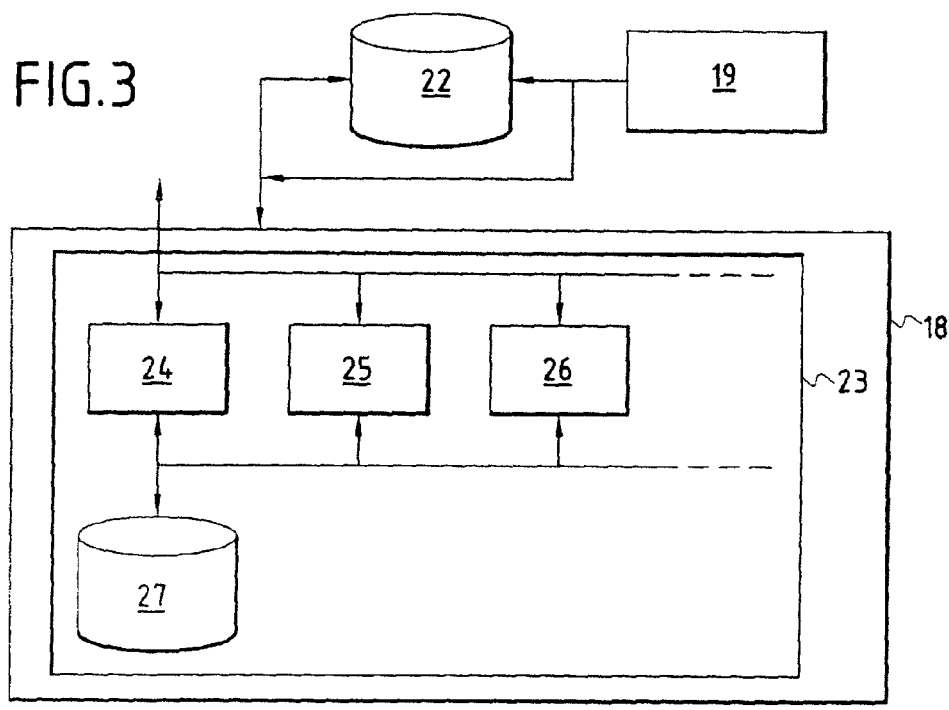
Figure 4:
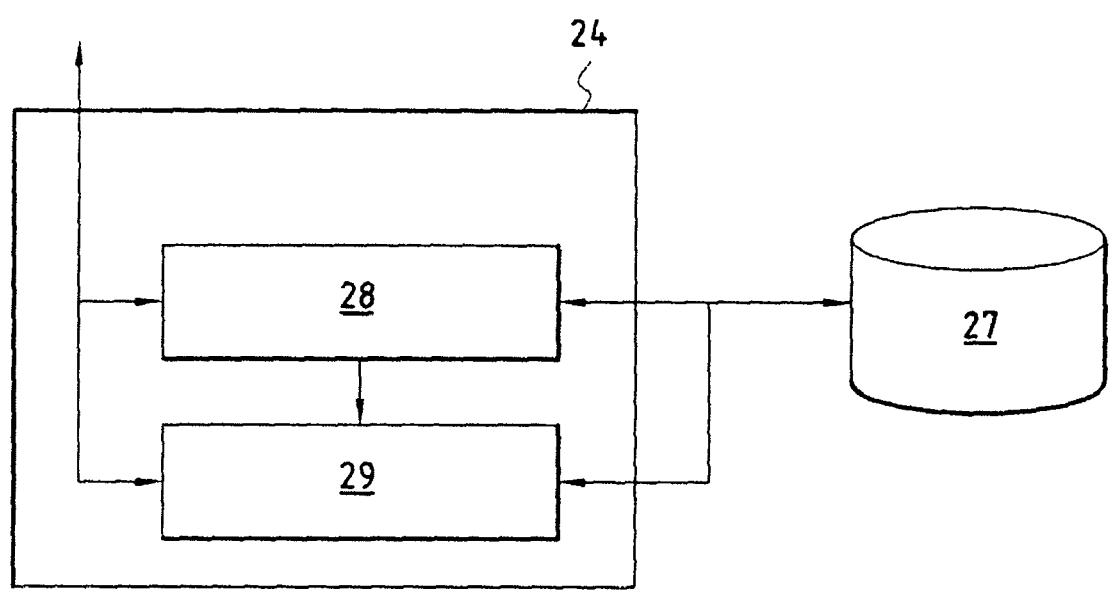
Figure 5:
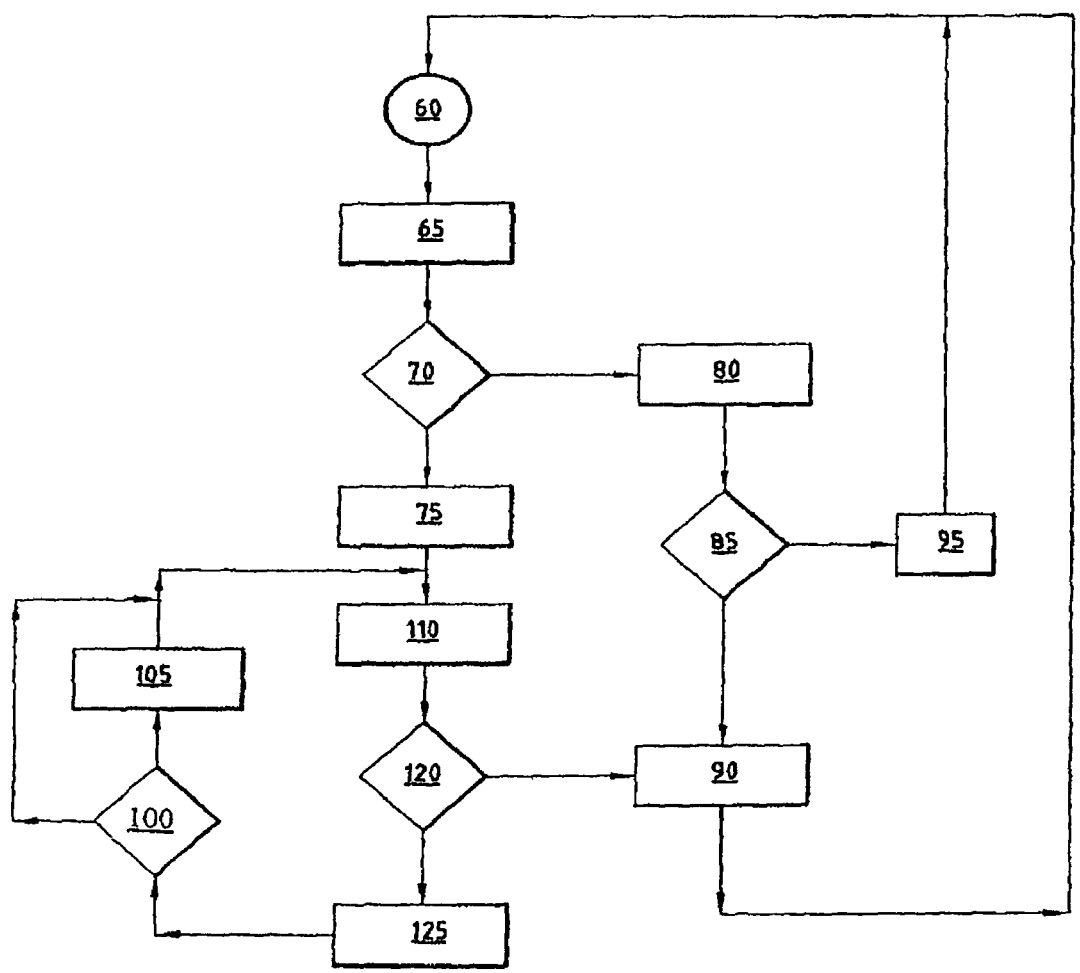

Other characteristics and advantages of the invention will emerge more clearly and more completely on reading the description that follows of the preferred variants for implementation of the method and creation of the device, which are provided here by way of non-limiting examples and with reference to the following appended drawings:

FIG. 1: schematically shows a network of the conventional type interconnected to the Internet, FIG. 2: shows the functional details of a firewall that includes the device of the invention, FIG. 3: schematically shows the functional details of a protocol analyser of the device of the invention, FIG. 4: schematically shows an independent communication protocol analysis module of the device of the invention, FIG. 5: schematically shows the method for detection and prevention of intrusions according to the invention.

FIG. 1 schematically shows a network of the conventional type interconnected to the Internet, as is familiar from previous designs. In this configuration, three zones are shown schematically at the centre of which the firewall 1 is located.

The first zone is an external zone like the Internet, for example, shown as 2 in FIG. 1.

The second zone, shown as 3, commonly called the demilitarized zone (DMZ), is equipped with intermediate security between the exterior and the interior. In this zone, there can be one or more servers 4.

The third zone is the internal zone proper, which can be divided into several segments. The first segment 5 corresponds to the cabled part of the internal network, and possibly includes one or more servers 6. Segments 7 and 8 respectively correspond to two local zones 9 and 10, each of which can include one or more workstations, respectively referenced 11 and 12.

The device and the method of the invention take advantage of the central position of the firewall in this type of configuration.

FIG. 2 shows the functional details of a firewall that includes the device of the invention. Thus, within the firewall (1), we find the network interfaces 13 through which communication data enter and leave, firstly coming from or to the internal users (within a company, for example) and the external users (outside the company, for example), and identified by the reference 14, and secondly coming from and to the resources such as information systems, company servers, and generally speaking any client infrastructure of the company servers, identified by the reference 15.

The term user, external or internal, refers not only to physical people, but also to applications for example, and, generally speaking any senders and/or receivers of information that communicate over the network.

Upstream of the network interfaces 13, and possibly but not necessarily within the firewall 1, the communications transit via a module 16 of the Network Address Translation (NAT) type, which in particular employs address translation for routing, and then via a module 17 of the Virtual Private Network (VPN) type which in particular employs data encryption and decryption.

The data finally transit via the module 18 for the detection and prevention of intrusion into the network. This module 18 implements the method of the invention, which will be explained in detail later. It employs the filtering policy specified by the user (or administrator) 190, by means of an administration interface 19 used to enter the criteria that determine this filtering policy, in natural language. The entry of these criteria can thus be accomplished, for example, by entering the name of a protocol, rather than the probable ports used by this protocol. Indeed it is this filtering policy which serves as a basis for the protocol analysis employed in the method of the invention.

In addition, the module for the detection and prevention of intrusion into the network generates alarms that are handled by module 20. Finally, the connection data which transit in this firewall, are transmitted by module 18 to a resource 21 of the "audit log" type, used for storing the history of the connections, after any processing.

FIG. 3 schematically shows the functional details of a protocol analyser of the device of the invention, incorporated into the module 18 of FIG. 2. In FIG. 3, we therefore find an analysis module 23 which includes one or more specific modules 24, 25, 26 for the analysis of a given protocol. Each of these modules is linked to a storage resource 27 in which are stored the data that will be used to check conformity to each of the protocols. Quite obviously, the choice of a single storage resource 27, for all of the data of all the protocols handled, does not limit the invention. In fact it is possible to envisage storing the respective data of each protocol separately. This analysis module 23 receives, as entry, the filtering criteria which are specified by the user via the administration interface 19, and which are stored in a storage resource 22 where appropriate. In particular, these criteria determine the modules that are actually activated, and those that are deactivated. Each of the activated modules 24, 25, 26 receives as entry the connection data to be analysed and, in a first stage, determines whether these data follow the protocol for which it has been predefined. If no module 24, 25, 26 recognises the protocol, then the connection is considered not to have been analysed.

FIG. 4 schematically shows an independent communication-protocol analysis module of the device of the invention. This module 24 includes a sub-module 28 for automatic recognition of the protocol, and a sub-module 28 for checking conformity to the protocol. Each of the modules 24, 25, 26 of FIG. 3 is identical in structure and function to the others. Each of these modules is independent in that it can be added to or removed from the assembly as required (module of the plug-in type) without causing upset.

The device of the invention, described in FIGS. 1 to 4, implements the method of the invention, which will now be explained in greater detail in an implementation variant, and with reference to FIG. 5.

If the coverage of the protocols is complete (ideally, one independent analysis module per possible protocol), then when a new connection occurs, it is automatically associated with an analysis module. In addition to the specific modules, each dedicated to a given protocol, a module of the generic type can also be used. This module is used to monitor the traffic of which none of the other modules recognises the protocol. This is particularly useful in the particular case of attacks of the "data mining" type.

As long as identification of the protocol is not achieved, the data are accepted but not transmitted. Each time a new data item arrives (reference 60), the detection functions of the various independent modules are executed in sequence (reference 65), module after module. During each execution, the detection function returns its opinion on the data packet (reference 70). This opinion can be of three types:
 a) protocol detected; the module has therefore recognised the protocol automatically and will be commanded to analyse it,
 b) protocol not detected, generic module present and activated; the generic module will be responsible for the analysis
 c) protocol not detected, generic module absent or present but not activated
 d) not enough information in the data packet to be detected.

When the detection function responds with a) or b), the specific module or the generic analysis module attaches itself to the connection (reference 75).

In particular, in case b) in which the aforementioned generic module is present and activated, a connection based on a protocol which is recognised by none of the other specific modules is automatically attached to this generic module (at the stage shown as 75).

In case c), if this generic module is not present, or is present but not activated, the data are accepted but not transmitted (reference 80). If all the modules respond with by c) or d), then the connection is considered not to have been analysed, and it is therefore not enabled.

In addition, beyond a certain threshold of unidentified data packets, and/or beyond a certain time of unsuccessful identification attempts, which is determined at the stage shown as 85, the evaluation ends and a dynamic rejection is generated (reference 90). If the threshold or thresholds are not exceeded, the evaluation ends and the connection is considered not to have been analysed (reference 95). These thresholds of data packet numbers and/or of time can be pre-determined, and fixed in the device, or they can be configurable by means of the interface 19 for administration of the device for example. They may possibly be calculated dynamically.

When a specific module is attached to the connection (at the stage shown as 75), the latter will check that the data which flow in the said connection do indeed match the detected protocol (reference 110). This therefore concerns verifying the conformity of the data of the protocol and verifying the use that is made of this protocol, where these checks concern grammar and syntax. These checks can refer to the standards which define these protocols and their uses, such as the Request for Comments (RFC), which are well known to the professional engineer.

When the generic module is attached to the connection (at the stage shown as 75), the latter does not check that the data flowing in the said connection do indeed match the detected protocol. In fact, by definition, attachment to the generic module means that no protocol has been recognised by the other modules. In this case, the generic module verifies the coherence of the packets. This coherence check can concern the sequencing and the retransmissions for example. In these cases, one checks in particular whether two successively analysed data packets are strictly identical or not (reference 110). Strict identity allows one to verify that a packet, thought to be a retransmission, is indeed a retransmission of the preceding one (attack by "data mining"). If the expected retransmission is not one in fact, then the packet is blocked and the connection is rejected or ended.

It can thus be seen that if the check on conformity to a given protocol previously recognised, or the generic check (reference 110), return a negative response, which is determined at the stage shown as 120, then the evaluation ends and a dynamic rejection is generated (reference 90). Otherwise, a dynamic authorization is delivered (reference 125), and the multi-layer analysis loop continues.

If a specific module, and not the generic module, is attached, which is determined at stage 100, the module associated with the protocol hierarchically immediately above the module previously attached is automatically attached (at the stage shown as 105) for later verification of conformity (at the stage referenced 110). Otherwise, the generic module remains attached and the loop continues with a generic check at the stage referenced 110.

Each communication flowing in a connection is therefore either dynamically enabled, or is dynamically rejected, according to whether the protocol verification module attached to the connection determines that the communication results from the normal or abnormal operation of the protocol.

Thus each module always receives the new connection as entry for protocol detection in a first stage. As a consequence, this detection which, if successful, will be followed by an analysis of the protocol, is not dependent upon the communication port used by the said protocol, as is generally the case with previous designs. In this way, the problems associated with the use of dynamic ports by some applications are avoided.

In addition, the check on the protocol, once recognised, enables one to avoid the problems associated with applications that use an open channel to communicate with other protocols. In fact, in the latter case, an alarm will be generated since, at one moment or another, the module responsible for checking a given protocol will detect data, within a data packet, that is not in conformity with the initial protocol.

Moreover, each module thus designed allows the delivery of a dynamic authorization of the connections resulting from the normal operation of the protocol. It is used in fact to obtain the data necessary for dynamic opening of the connections induced by the protocol, with a main connection in fact being able to induce one or more secondary (or induced) connections. In this case, it is essential that all the secondary connections should be associated with enabling of the main connection. Only a module for the analysis in depth and with precision of the operation of the protocol can precisely know the communication ports to open and close.

The analysis network employed by these modules is of the multi-layer analysis type. At each stage, the current module analyses the part of the data packet corresponding to the protocol for which it is designed, and transmits the other part to the analysis module of the next higher protocol in the hierarchy (Ethernet, then IP, then TCP, and then HTTP, for example).

Thus, the analysis based on verifying the conformity of the protocol and its use, defined by the standards such as the RFC, amongst other things allows the prediction of not only the known attacks but also the unknown attacks. Any traffic that does not satisfy the specifications of these standards will be blocked in real time. Moreover, since the modules for automatic protocol recognition and analysis are independent, they can be added or removed simply, without upsetting the device. When they are present, they can also be activated or deactivated simply, according to the filtering policy specified by the user. Thus, each new security gap can be filled easily. These intelligent agents that constitute the automatic protocol recognition and analysis modules, continuously analyse the traffic stream and attach themselves dynamically when they recognise the protocol, independently of the communication port used.

All of the above description is given by way of an example, and does not limit the invention. In particular, the firewall described above can include a very large number of other functional modules in addition to those mentioned here. In particular, one might consider the use of proxies, which are well known to the professional engineer.

Likewise, the fact that the above description presents 3 modules 24, 25, 26 for the automatic recognition and verification of a given protocol does not limit the invention. The total number of such modules depends on the number of protocols handled (HTTP, FTP, H323, DNS, RIP, etc.). In addition, a module of the generic type as described above can be attached or not as needed. Also, as described above, each specific module, or generic if the latter is present, can be activated or deactivated simply as required. Finally, the verification effected by the generic module, in particular concerning the correct sequencing and retransmission of the packets (and especially verification of the strict identity of two data packets analysed in succession), is only one example of the verification that can be performed by such a module. Any other verification not associated with the conformity to a given protocol enters into the generic verification category, and can be integrated into the said generic module.

The invention claimed is:

1. A method for the detection and prevention of intrusions into a computer network with a firewall, the method comprising:
    detecting the connections at a central point and before each branch of said network,
    selective filtering of the said connections, where said selective filtering stage includes firstly a stage for automatic recognition of the accessing protocol, independently of the communication port used by the said protocol, and secondly, after said accessing protocol has been recognized automatically, a stage for verifying the conformity of each communication flowing in a given connection to the said protocol, to deliver a dynamic authorization for communications resulting from normal operation of the protocol and to deliver a dynamic rejection for communications resulting from abnormal operation of the protocol,
        wherein said check on conformity is performed layer by layer, by successive protocol analysis of each part of the data packet flowing in the connection corresponding to a given protocol, from the lowest protocol to the highest protocol, and
        wherein, since each main connection enabled is able to induce one or more secondary connections, said check on conformity detects the data necessary for opening said secondary connections and dynamically attaches said secondary connections to the authorization for connection of said main connection.

2. A method according to claim 1, wherein, as long as the accessing protocol of a connection is not recognized, the data are accepted but not transmitted.

3. A method according to claim 2, wherein, if the number of data packets accepted but not transmitted exceeds a certain threshold, or if the data are accepted but not transmitted for a time exceeding a certain threshold, then the connection is considered not to have been analyzed.

4. A method according to claim 2, wherein if the data are accepted but not transmitted for a time exceeding a certain threshold, then the connection is considered not to have been analyzed.

5. A method according to claim 2, wherein, when the accessing protocol of a connection is not automatically recognized, said step of checking on conformity of each communication flowing in a given connection to said protocol is replaced by a step of generic checking of coherence of data packets.

6. A device for the detection and prevention of intrusions into a computer network, comprising:
    a firewall,
    a resource for preventing intrusions by detection of the connections, directly incorporated into said firewall at a central point and before each branch of said network, where said resource for the prevention of intrusions includes a resource for selective filtering of said connections by automatic recognition of the accessing protocol, independently of the communication port used by said protocol,
        wherein said selective filtering resource includes at least one independent module for the analysis of at least one given communication protocol, and
        at least one of the independent modules includes:
        i. unit for the automatic recognition of a given communication protocol,
        ii. unit for verifying the conformity of the communication flowing in a given connection to the said protocol,
        iii. unit for delivering a dynamic authorization for communications resulting from normal operation of the protocol, and delivering a dynamic rejection for communications resulting from abnormal operation of the protocol, and
        iv. unit for transmitting part of a data packet to an independent analysis module of a hierarchically higher protocol, and wherein said unit for verifying the conformity of the communication flowing in a given connection, called main connection, to the said protocol, comprising means of detection of the data necessary for opening secondary connections induced by said main connection, and of attachment of said secondary connections to the authorization for connection of said main connection.

7. A device according to claim 6, wherein, in addition to the independent module or modules for the analysis of a given communication protocol the device includes an independent generic module which attaches itself to the connections for which the protocol has been recognized by none of the other said independent modules.

8. A device according to claim 6, wherein the device includes an interface for entry, by a user, of the criteria that determine the filtering policy.

9. A device according to claim 8, wherein, said interface receives the criteria specified in natural language by the user.

10. A device according to claim 9, wherein said criteria specified in natural language include at least one protocol name.

11. A device according to claim 8, wherein said interface allows the activation or deactivation of each of said independent modules.

12. A device according to claim 6, wherein the device includes a resource for statistical processing of the connection data, and a resource for storage of said connection data and processed data.

* * * * *